United States Patent Office

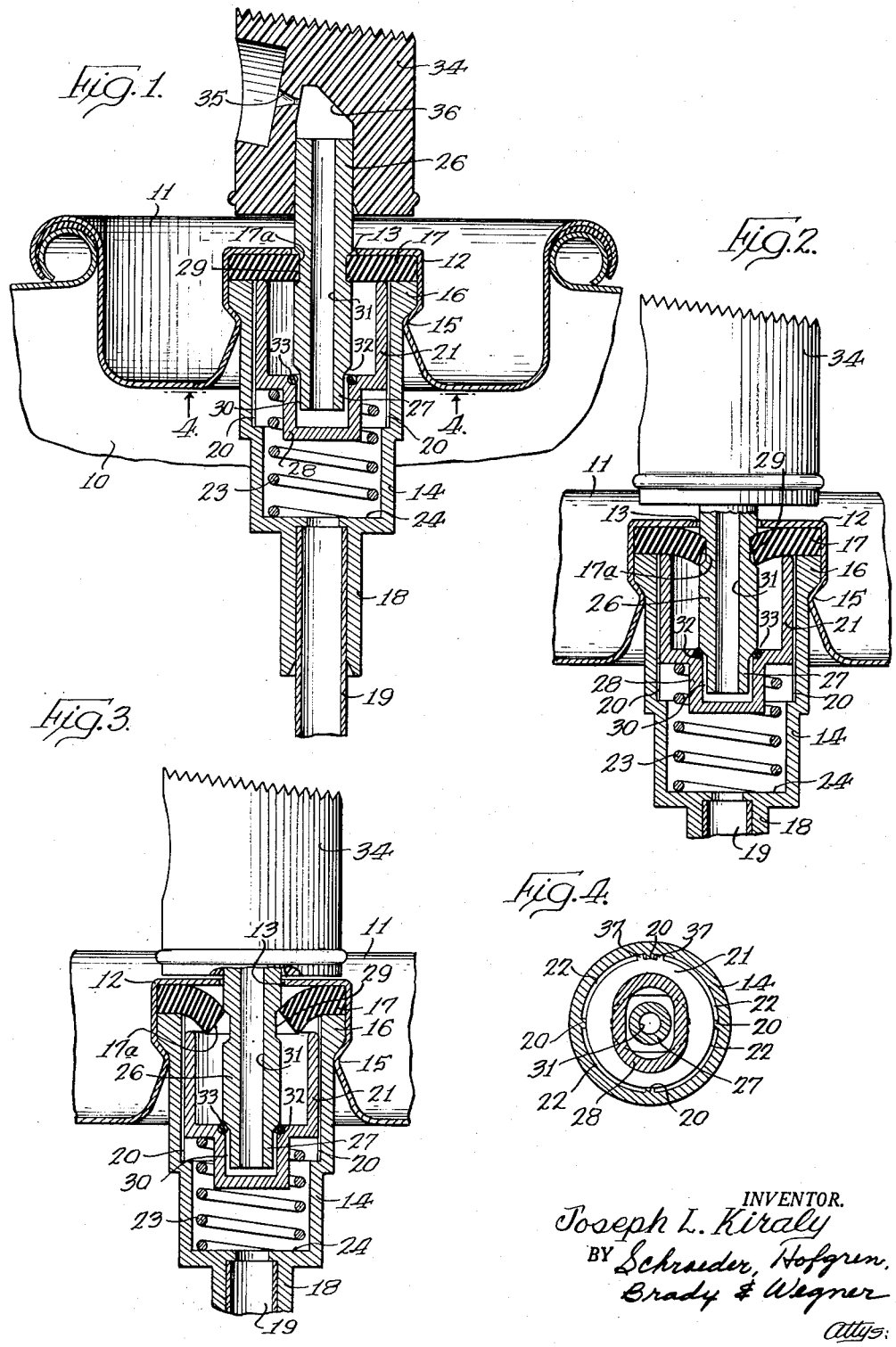

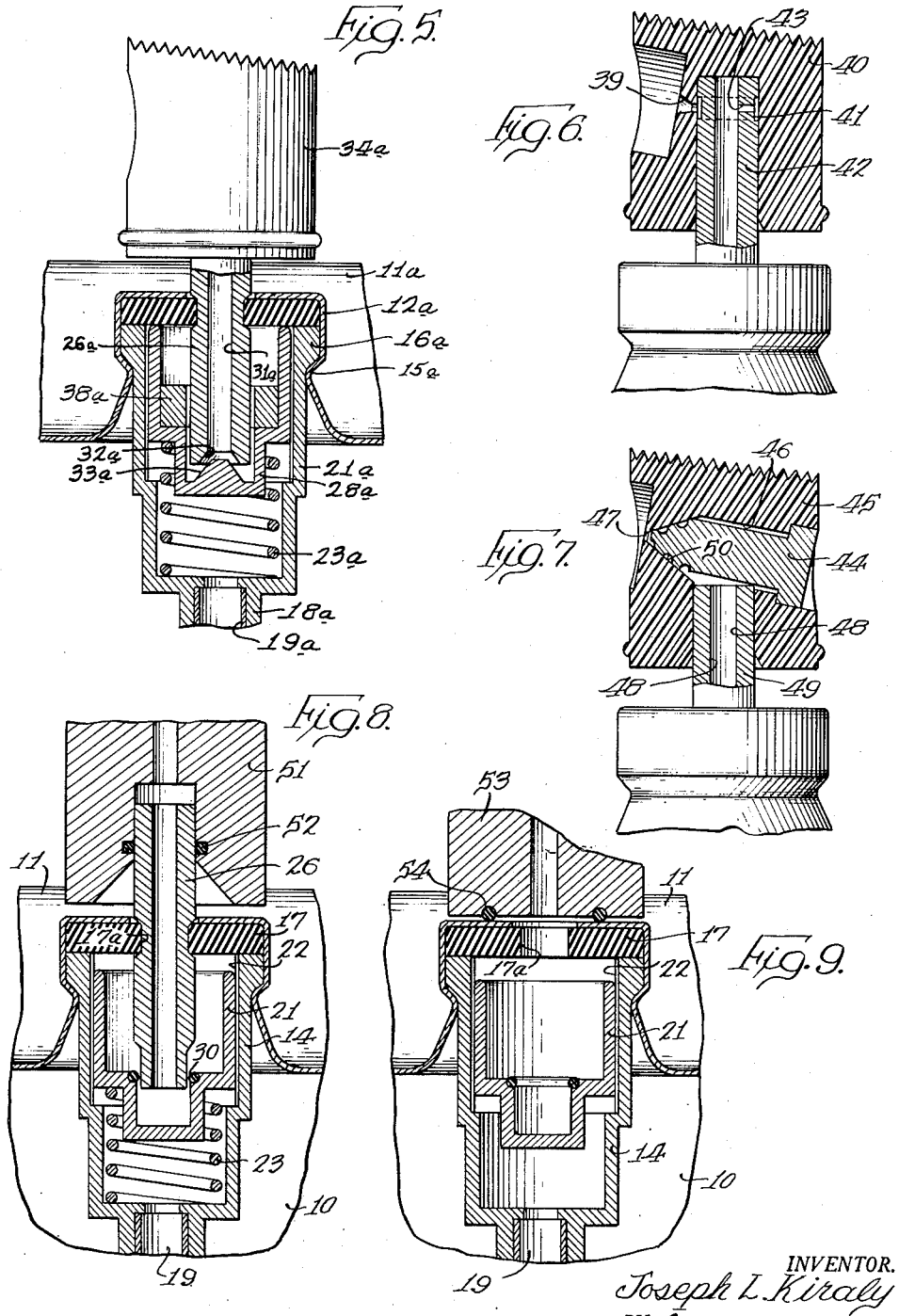

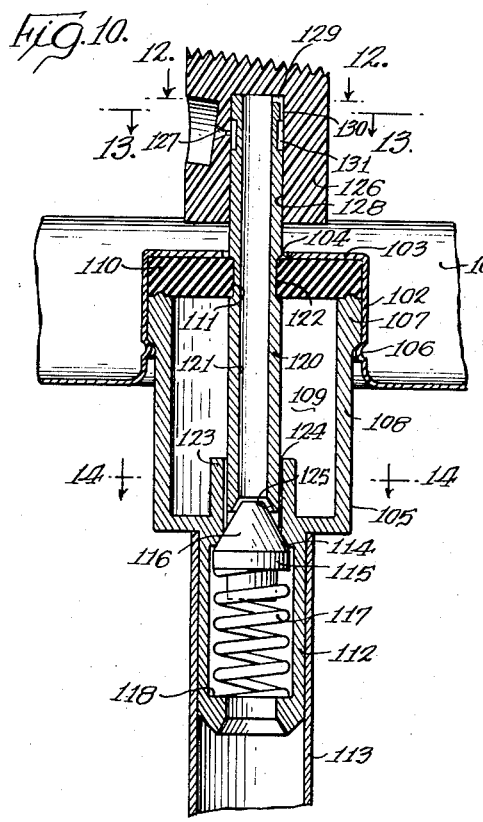
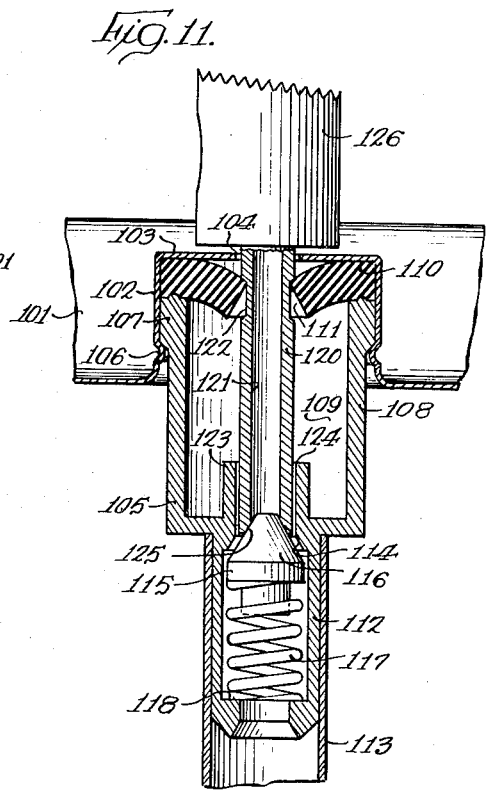
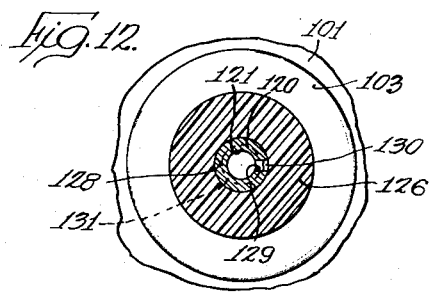
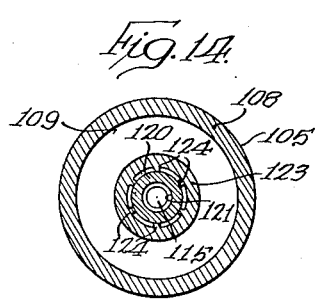
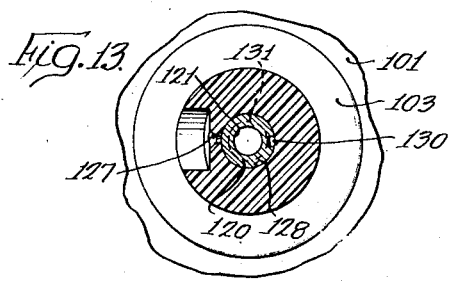

2,835,417
Patented May 20, 1958

2,835,417

METERED DOSAGE VALVE

Joseph L. Kiraly, La Grange Park, Ill.

Application June 4, 1956, Serial No. 589,022

23 Claims. (Cl. 222—355)

This invention relates to a valve and, more particularly, to an outlet valve for a container of fluid under pressure.

It is the general object of this invention to provide a new and improved outlet valve adapted to provide a measured dosage output.

One object of this invention is to provide a new and improved metering valve including a tubular measuring chamber, a sealing gasket therefor having a central opening, a hollow stem extending through the opening in the gasket into the measuring chamber so as to provide a normally open discharge passage from the measuring chamber, the stem being depressible to first close the discharge passage and then to supply fluid to the measuring chamber, and a spray cap mounted on the outer end of the hollow stem.

Another object of this invention is to provide such a metering valve wherein the measuring chamber is a cup member loosely fitted in a sleeve member and normally urged by a spring against the sealing gasket to prevent fluid from flowing between the sleeve and the cup into the cup from a fluid intake conduit connected to the tubular member, the stem being depressible to first close the normally open discharge passage by engagement of the inner end of the stem with a valve seat at the bottom of the cup and then to shift the cup away from the gasket to permit the cup to fill with fluid.

A further object of this invention is to provide such a valve wherein the stem is rotatable between two positions relative to the cup, in one of which positions movement of the stem provides the measured dosage fluid output and in the other position, movement of the stem provides a continuous fluid output inasmuch as the discharge passage is not closed.

A still further object of this invention is to provide such a valve wherein the container may be filled with fluid under pressure by positioning a pressure filling head over the hollow stem.

Another object of this invention is to provide another modification of the metering valve wherein the tubular measuring chamber has a reduced portion with a fluid intake conduit connected thereto and a normally closed valve member movable therein, the hollow stem adapted when depressed to first engage the valve member to close the normally open discharge passage and then to shift the valve member against a spring to allow the measuring chamber to fill with fluid.

Other objects and advantages will become apparent from the following detailed description taken in connection with the accompanying drawings, in which:

Fig. 1 is a vertical sectional view of a preferred embodiment of the invention showing the movable members in their normal positions;

Fig. 2 is a fragmentary vertical sectional view similar to Fig. 1 showing the stem moved to a first position to close the discharge fluid passage;

Fig. 3 is a fragmentary vertical sectional view similar to Figs. 1 and 2 showing the stem moved to a second position wherein movement of the cup opens the intake fluid passage;

Fig. 4 is a horizontal sectional view taken generally along line 4—4 of Fig. 1 with the stem rotated 90° with respect to the cup;

Fig. 5 is a fragmentary vertical sectional view similar to Fig. 1 showing a modified discharge passage sealing means and a dosage decreasing collar disposed in the measuring cup;

Fig. 6 is a vertical sectional view showing a modified spray cap;

Fig. 7 is a vertical sectional view showing a further modification of the spray cap;

Fig. 8 is a vertical sectional view showing means for filling the container with fluid under pressure through the valve;

Fig. 9 is a vertical sectional view showing another modification of means for filling the container with fluid under pressure;

Fig. 10 is a vertical sectional view of another embodiment of the invention showing the stem in its normal position;

Fig. 11 is a vertical sectional view similar to Fig. 10 showing the stem in its depressed position;

Fig. 12 is a horizontal sectional view taken generally along line 12—12 of Fig. 10;

Fig. 13 is a horizontal sectional view taken generally along line 13—13 of Fig. 10; and Fig. 14 is a horizontal sectional view taken generally along line 14—14 of Fig. 10.

While several preferred embodiments of the invention are herein described, they are not intended to limit the invention to the specific forms and arrangements shown, it being contemplated that various changes may be made by those skilled in the art without departing from the spirit and scope of the appended claims.

As shown in Figs. 1 to 4, a container 10 of fluid under pressure has a top member 11 including a neck-like portion 12 with an opening 13 formed therein. A tubular shell member or sleeve 14 is mounted in the neck-like portion 12 and secured therein by an indented portion 15 thereof engageable with an outwardly flanged portion 16 of the sleeve 14. The upper end of the sleeve 14 is substantially closed by a resilient sealing member or gasket 17 disposed between the sleeve 14 and an inwardly flanged portion of the neck-like portion 12, while a lower reduced portion 18 of the sleeve 14 supports a conduit 19 which is adapted to extend to a position adjacent the bottom of the container 10.

As best shown in Figs. 1 and 4, a portion of the inner bore of the sleeve 14 has a plurality of longitudinally extending ribs 20 formed thereon. A measuring cup 21 open at its upper end is movably mounted within the ribbed portion of the sleeve 14, the spaces defined by the ribs 20, the inner bore of the sleeve 14, and the outer surface of the measuring cup 21 forming fluid intake passages 22 (Fig. 4) adapted to communicate at the upper end with the measuring cup 21 and communicating at all times at the lower end with the fluid conduit 19. As shown in Fig. 1, the fluid passages 22 are normally closed as the result of a spring 23 urging the measuring cup 21 upwardly against the gasket 17, the spring 23 being seated at its lower end against a shoulder 24 formed in the sleeve 14.

The control member for this valve is a hollow stem 26 which passes through an opening 17a in the gasket 17 and into the cup 21, the lower end of the stem 26 having a reduced portion 27 loosely slidable in a reduced or depressed portion 28 of the cup 21 which acts as a guide. As shown in Figs. 1, 2 and 3, the edges of the opening 17a in the gasket 17 engage an annular groove 29 formed in the stem 26 to provide a fluid seal. Thusly, when the stem 26 is moved downwardly from its normal position, the center portion of the gasket 17 is bent downwardly so that when the downward force on the stem 26 is released, the resilient gasket 17 acts to urge the stem 26 upwardly to its initial position. As a result of the looseness of the fit of the reduced end portion 27 of the stem 26 in the reduced portion 28 of the cup 21, a fluid discharge passage 30 is defined therebetween so as to provide a communication between the measuring cup 21 and a bore 31 formed in the stem 26. The fluid discharge passage 30 may be closed by providing engageable sealing means between the stem 26 and the cup 21, such as the valve surface 32 formed on the stem 26 and the sealing ring 33 mounted in the upper end of the reduced portion 28 of the cup 21 in the embodiment shown in Figs. 1, 2, 3 and 4. A modified form of sealing means for the discharge passage is shown in Fig. 5 wherein the inner end of a stem 26a has an internal conical valve surface 32a formed thereon and engageable with a conical valve member 33a projecting upwardly from the bottom of the reduced portion 28a of the cup 21a.

To provide the desired atomization of the fluid escaping from the container 10, a spray cap 34, Fig. 1, is carried on the upper end of the stem 26, the spray cap 34 having an atomizing aperture 35 formed therein and communicating with the bore 31 in the stem 26 through a chamber 36 in the cap 34.

The operation of this device is best described with reference to Figs. 1, 2 and 3. The valve is shown in its normal position in Fig. 1, wherein the fluid discharge passage 30 from the cup 21 to the bore 31 in the stem 26 is open and the fluid intake passage 22 from the fluid container 10 to the cup 21 is closed. Fig. 2 shows the position of the stem 26 after it has been moved downwardly until the valve surface 32 on the stem 26 has engaged the sealing ring 33 in the measuring cup 21 so as to seal the discharge passage 30 from the cup 21 to the hollow stem 26. As the stem 26 is moved further downwardly to the position shown in Fig. 3, the stem 26 moves the measuring cup 21 downwardly against the action of the spring 23 and away from the gasket 17 so as to open the intake passage 22 from the fluid container 10 to the measuring cup 21 thus filling the measuring cup 21 with fluid under pressure.

When the valve stem 26 is released, the spring 23 first urges the measuring cup 21 upwardly against the gasket 17 so as to seal the fluid intake passage 22 from the fluid container 10 to the measuring cup 21. The resilient gasket 17 then acts to shift the stem 26 further upwardly to its initial position thus opening the fluid discharge passage 30 from the cup 21 to the hollow stem 26 and permitting the measured amount or dosage of fluid in the cup 21 to pass upwardly through the stem 26 and out the atomizing aperture 35 in the spray cap 34.

The embodiment shown in Fig. 5 operates in the same manner as the embodiment of Figs. 1, 2, 3 and 4 to provide a metered dosage output.

As it is sometimes desirable to be able to provide a continuous flow of fluid from a container of fluid under pressure rather than a series of measured dosages, the valve construction disclosed in Figs. 1, 2, 3 and 4 includes means for selectively providing a measured dosage of fluid and a continuous flow of fluid. Referring now to Fig. 4, the reduced portion 28 of the measuring cup 21 is provided with an oval or non-circular configuration which is adapted to mate with a similar oval or non-circular configuration of the valve surface 32 on the valve stem 26, the sealing ring 33 having the same shape. Thus, when the valve stem 26 is in a position wherein the valve surface 32 is in alignment with the reduced portion 28 of the measuring cup 21, the discharge passage 30 from the cup 21 to the hollow stem 26 will be sealed when the stem 26 is moved downward to the position shown in Fig. 2.

When it is desired to provide a continuous flow of fluid from the container 10, the hollow stem 26 is rotated relatively to the measuring cup 21 approximately 90° as shown in Fig. 4, so that upon the stem 26 being depressed against the sealing ring 33, the fluid discharge passage 30 from the cup 21 to the stem 26 will not be sealed. Thus, as the stem 26 is further depressed to the position shown in Fig. 3, the fluid intake passage 22 from the container 10 to the cup 21 and the fluid discharge passage 30 from the cup 21 to the spray cap 34 will be simultaneously opened, thus providing a continuous flow of fluid from the aperture 35 in the spray cap 34. To prevent rotation of the measuring cup 21 with the hollow stem 26, a pair of projections 37 (Fig. 4) are formed on the measuring cup 21 closely adjacent opposite sides of one of the ribs 20 formed on the sleeve 14, thus preventing rotation of the measuring cup 21 in the sleeve 14 as the stem 26 is rotated.

In order to vary the metered dosage of fluid from this valve, means are provided, as shown in the embodiment of Fig. 5, for varying the volume of the measuring cup 21a. As shown in Fig. 5, an annular collar member 38a is disposed in the measuring cup 21a loosely surrounding the hollow stem 26a, thus effectively reducing the volume of fluid allowed to enter the measuring cup 21a. It is intended that a series of such collars of various sizes may be provided to provide various volumes of fluid metered by the valve.

In order to provide more effective atomization of the fluid discharged from the valve, two additional modifications of the spray cap are shown in Figs. 6 and 7. In Fig. 6, an aperture 39 formed in a spray cap 40 communicates with an annular groove 41 formed on the external surface of a hollow stem 42. The fluid passing upwardly through the hollow stem 42 communicates with the annular groove 41 through a port 43 formed in the stem 42 diametrically opposite from the aperture 39 in the spray cap 40.

In Fig. 7 a plug member 44 is secured in a spray cap 45 in a bore 46 formed between an atomizing aperture 47 and a bore 48 in a hollow stem 49. The plug member 44 has an annular spiral groove 50 formed thereon opening at one end to the bore 48 of the stem 49 and at the other end to the spray cap aperture 47 so as to impart a spiral movement to the fluid discharged through the aperture 47 and thus improve the atomization of such fluid.

This valve structure also permits filling of the container 10 through the valve with fluid under pressure and two modifications of such pressure filling means are shown in Figs. 8 and 9. In Fig. 8 the spray cap has been removed from the hollow stem 26 and a pressure filling head 51 including an O-ring seal 52 has been positioned over the hollow stem 26. The fluid under pressure passes downwardly through the hollow stem 26 and into the measuring cup 21 through the normally open discharge passage 30 between the cup 21 and the hollow stem 26. The fluid pressure is sufficient to move the measuring cup 21 downwardly against the action of the spring 23 so as to open the intake passage 22 between the measuring cup 21 and the container 10 and thus allow the fluid to flow directly from the pressure-filling head 51 into the container 10. When the pressure-filling head 51 is removed from the hollow stem 26, the spring 23 is operable to force the measuring cup 21 upwardly against the sealing gasket 17 so as to prevent the escape of the fluid in the container 10.

The slightly different modification shown in Fig. 9 is adapted for use when the hollow stem has not been assembled in the valve. In this modification a pressure-filling head 53 is disposed adjacent the opening 17a in the gasket 17 with an O-ring seal 54 disposed therebetween. The fluid under pressure passes directly into the container 10 through the discharge passage 22 opened by the pressure shifting the measuring cup 21 downwardly. When the pressure-filling head 53 is removed, the spring 23 urges the cup 21 upwardly, thus preventing the fluid from escaping from the container 10. The hollow stem and the spray cap may then be assembled in the valve.

In another modification of the metering valve shown in Figs. 10–14, a top member 101 of a container of fluid under pressure (not shown) has an upstanding cylindrical neck portion 102 including an upper end 103 with a small opening 104 formed therein. A tubular member 105 (similar to tubular sleeve 14 of the first modification) is mounted in the neck portion 102 and secured therein by an annular indented portion 106 engaging an outwardly flanged portion 107 of the tubular member 105, as in the first modification.

The upper portion 108 of the tubular member 105 forms a measuring cup or chamber 109 which has its upper end substantially closed by a resilient sealing gasket 110 (similar to gasket 17 of the first modification) having a central opening 111 and which is disposed between the upper end of the tubular member 105 and the end 103 of the neck portion 102. The lower portion 112 of the tubular member 105 is reduced in diameter and has a fluid intake conduit 113 mounted thereon and adapted to extend adjacent the bottom of the container of fluid (not shown), the bore of portion 112 joining with conduit 113 to form an inlet passage to the measuring chamber.

In order to provide a controllable inlet passage to the measuring chamber 109, an annular conical surface 114 is formed within the reduced portion 112. A movable valve member 115 having an upwardly extending conical valve 116 is normally urged against the valve surface 114 by a spring 117 which is seated at its lower end against an inwardly extending shoulder 118 formed at the lower end of the reduced portion 112.

A movable hollow stem 120 (similar to the stem 26a of the modification of Fig. 5) having a through bore 121 extends downwardly through the opening 104 in the upper end 103 of the neck portion 102 and the opening 111 in the sealing gasket 110 into the measuring chamber 109. The stem 120 has an annular groove 122 engaged by the edges of the opening 111 in the sealing gasket 110, as in the first modification, to provide a fluid seal. The lower end of the stem 120 is loosely guided in a relatively short cylindrical portion 123 of the tubular member 105 upstanding from the valve surface 114. In order to provide a discharge passage from the measuring chamber 109, a series of internal longitudinally extending ribs 124 (Fig. 14) are formed in the cylindrical guide portion 123 to provide fluid passages between the guide portion 123 and the outer surface of the tube 120 to permit fluid to flow from the measuring chamber 109 to the bore 121 in the stem 120.

To provide means for closing the discharge passage, the inner end of the stem 120 has an internal conical surface 125 formed thereon and adapted to be engaged by the valve 116 on the valve member 115, as in the embodiment of Fig. 5. In the normal position of the stem 120, Fig. 10, the surface 125 on the stem 120 is spaced above the valve 116 so that the discharge passage is normally open.

To provide atomization of the fluid discharged from the valve, a spray cap 126 having an atomizing aperture 127 and a downwardly extending bore 128 is fitted over the upper end of the hollow stem 120. The discharging fluid passes from the bore 121 of the stem 120 to the atomizing aperture 127 through a metering channel including a radial slot 129 formed in the upper end of the stem 120 diametrically opposite from the aperture 127, a longitudinally extending slot 130 formed on the exterior surface of the stem 121 and an external annular groove 131 formed on the stem 120 and opening into the aperture 127. This metering channel is best shown in Figs. 10, 12 and 13.

When the stem 120 is depressed from its normal position shown in Fig. 10, the surface 125 on the stem 120 first engages the valve 116 to close the discharge passage and then shifts the valve 116 away from the surface 114, as shown in Fig. 11, to open the inlet passage and permit the measuring chamber 109 to fill up with fluid.

The central portion of the resilient sealing gasket 110 is then bent downwardly when the stem 120 is depressed so as to maintain an effective liquid seal therebetween. When the stem 120 is released, the spring 117 urges the valve member 115 upwardly until the valve 116 engages the surface 114 and closes the inlet passage and then the stressed sealing gasket 110 acts to return the stem 120 to its initial position so as to open the discharge passage and allow the measured volume of fluid in the measuring chamber 109 to pass upwardly through the stem 120, through the metering channel and out the atomizing aperture 127 in the spray cap 126 to the atmosphere.

The invention herein disclosed provides a number of modifications of a simple metering valve construction which are very simple to operate, economical to manufacture and which require a minimum number of parts which may be easily assembled. The valves are very efficient in operation and are adapted for providing a measured dosage fluid output with the first modification described also adapted to provide selectively a continuous flow of fluid under pressure from the container to the atmosphere.

I claim:

1. A metered dosage valve adapted to be mounted in one wall of a container of fluid under pressure comprising: a supporting sleeve having a plurality of internal longitudinally extending ribs formed thereon so that spaces between the ribs provide fluid passages, a fluid intake tube leading to the inner end of the sleeve, a measuring cup movably mounted in said sleeve in sliding engagement with said ribs and having a depressed portion at the closed end, a resilient gasket having an opening therein and sealing against the open ends of said sleeve and said measuring cup, a spring disposed in said sleeve normally urging the lip of said cup against said sealing gasket to prevent fluid in said passages from filling said cup, a movable hollow stem having a spray cap secured to its upper end passing through the opening in said sealing gasket in sealing engagement therewith and having a reduced end portion loosely movable and guided in said depressed portion of the cup so as to provide a fluid passage between the cup and the spray cap, a valve surface on the stem engageable with a valve seat on the edge of the reduced portion of the cup to control the fluid passage between the cup and the spray cap, movement of said stem into the sleeve successively sealing said fluid passage between said hollow stem and said measuring cup and then moving said measuring cup away from said gasket to permit the cup to be filled with fluid and movement of said stem out of the sleeve successively sealing said fluid passages to said cup and opening said fluid passage from said cup to the spray cap to permit the measured dosage of fluid to pass through the hollow stem to the spray cap.

2. A metered dosage valve adapted to be mounted in the top of a container of fluid under pressure comprising: a sleeve adapted to be mounted in an opening in the top of the container, a fluid conduit extending from the lower end of the sleeve to a position adjacent the bottom of the container, a gasket having an opening therein sealing against the upper end of the sleeve, a measuring cup loosely mounted in said sleeve and having an open upper end, a spring adapted to normally hold said cup against said gasket to prevent fluid from filling said cup, a movable stem passing through the opening in said gasket and into said cup to normally provide communication between the cup and a longitudinal bore in said stem, sealing means between the hollow stem and the cup engageable upon a downward movement of the stem, said cup adapted to be shifted away from said gasket upon further downward movement of the stem to permit the cup to be filled with fluid, and a spray cap secured to the upper end of said hollow stem and having an aperture adapted to permit the escape of the measured dosage of fluid in said cup upon the upward movement of the stem.

3. A metered dosage valve of the type described in claim 2 wherein said sealing means between said hollow stem and said cup are selectively engageable or disengageable upon the downward movement of the stem to respectively provide a measured dosage of fluid from the spray cap or a continuous flow of fluid from the spray cap.

4. A metered dosage valve of the type described in claim 2, wherein the aperture in said spray cap communicates with an external annular groove formed in said stem which in turn communicates with the bore in said stem through a port disposed diametrically opposite to said aperture to improve the atomization of the escaping fluid.

5. A metered dosage valve of the type described in claim 2 wherein said spray cap includes a member having a spiral fluid passage extending between the bore in said stem and the aperture in said spray cap to improve the atomization of the escaping fluid.

6. A metered dosage valve of the type described in claim 2 including an annular collar adapted to be disposed in said measuring cup to decrease the volume of the metered dosage of fluid.

7. A metered dosage valve comprising: a tubular mounting member having a fluid inlet at one end and sealing means having an opening therein secured against the other end, a measuring cup movably mounted in said tubular member, an inlet fluid passage between the fluid inlet and said cup controlled by movement of said cup, resilient means normally urging the cup to a position to close said inlet fluid passage, and a hollow stem passing through the opening in said sealing means and movable in said cup, a normally open discharge fluid passage between said cup and said hollow stem, movement of said stem adapted to successively control said discharge fluid passage and the movement of said measuring cup.

8. A metered dosage valve for a container of fluid under pressure comprising: a hollow member adapted to be mounted in an opening in the top of such a container and having a fluid inlet conduit secured to its inner end, sealing means having an opening therein secured against the upper end of said member, a measuring cup movably mounted in said member, a movable hollow stem passing through the opening in said sealing means and into said cup, fluid passage means extending from said fluid inlet conduit through said cup to said hollow stem, and resilient means acting against said cup to normally close said passage means at a position between the fluid inlet conduit and said cup, said hollow stem being movable in one direction to successively close said passage means at a position between said cup and said hollow stem and then to shift said cup to open said passage means at said position between the fluid inlet conduit and said cup and in the other direction to successively close said passage means at said position between the fluid inlet conduit and said cup and then to open said passage means at said position between said cup and said hollow stem.

9. A metered dosage valve of the type described in claim 8 having a spray cap secured to said hollow stem, said spray cap having an aperture adapted to atomize the fluid passing from the hollow stem to the atmosphere.

10. A metered dosage valve comprising: a cylindrical member having an inlet for fluid under pressure at one end and apertured sealing means at the other end, a measuring cup loosely mounted in said member to provide an inlet fluid passage between the inlet and said cup, resilient means normally urging said cup against said sealing means to close said inlet fluid passage, a discharge fluid passage between the cup and the atmosphere, and an elongated member passing through the apertured sealing means and movable longitudinally successively relative to and with said cup to respectively close said discharge passage and open said inlet passage and alternately movable longitudinally successively with and relative to said cup to respectively close said inlet passage and open said discharge passage.

11. A metered dosage valve of the type described in claim 10 including a member selectively positionable in said measuring cup to vary the volume of the metered dosage of fluid.

12. A metered dosage valve of the type described in claim 10 wherein said elongated member is rotatable relative to said measuring cup to a position whereupon longitudinal movement of said member with said cup results in simultaneous opening of said inlet and said discharge fluid passages.

13. A metering valve comprising: a tubular member having its lower end attached to a fluid intake tube and its upper end secured against a sealing gasket having a central opening, a measuring cup fitted loosely in the tubular member and normally held with its lip against the gasket by a spring to prevent passage of fluid from the intake tube to the interior of the cup, and a hollow stem having a spray cap on its outer end and extending through the opening in the gasket and in sealing engagement therewith to a position adjacent the bottom of the cup.

14. A metering valve of the type described in claim 13 wherein the measuring cup is movable from a discharge position to a filling position by movement of the hollow stem and movable from the filling position to the discharge position by the action of the spring.

15. A valve of the type described in claim 14 having sealing means on the hollow stem and on the cup selectively engageable and disengageable during movement of the cup to respectively provide metered dosage outputs from the valve and continuous output from the valve.

16. A valve of the type described in claim 15 wherein said sealing means on said hollow stem and said cup are non-circular in shape and wherein said hollow stem is rotatable with respect to said cup so that said sealing means are engageable in one rotative position of said stem and non-engageable in another rotative position of said stem.

17. A valve comprising: a sleeve member having an inlet for fluid under pressure at one end and a sealing member with a central opening disposed against the other end, a measuring cup loosely mounted in said sleeve member so as to provide an intake passage from said fluid inlet to said cup, resilient means normally urging the lip of said cup against said sealing member to close said intake passage, a hollow stem passing through the opening in said sealing member to a position adjacent the bottom of the cup to provide a discharge fluid passage from the cup to a spray cap carried on the outer end of the stem, sealing means on the inner end of said stem and on the bottom of said cup engageable to close said discharge passage, said stem being movable inwardly of the sleeve member to successively close said discharge passage and shift said cup to open said intake passage and allow said cup to fill with fluid under pressure, movement of said stem out of the sleeve member successively closing said intake passage and opening said discharge passage to permit the fluid in the cup to escape through the spray cap.

18. A valve of the type described in claim 17 wherein said stem is rotatable with respect to said cup and wherein said sealing means on said stem and the bottom of said cup are non-circular in shape whereupon inwardly movement of said stem when said sealing means are in rotatable misalignment produces simultaneous opening of said intake and discharge passages to provide a continuous non-metered discharge of fluid from the spray cap.

19. A metering valve comprising: a tubular measuring chamber, a sealing gasket therefor having a central opening, a hollow stem extending through the opening in said gasket into said measuring chamber and having a spray cap secured to the outer end thereof, said hollow stem providing a normally open discharge passage from said measuring chamber, and means operable to close the discharge passage and then to supply fluid to said chamber when said stem is depressed.

20. A metering valve comprising: a tubular cup member, a sealing gasket for the upper end of the cup member and having a central opening, a hollow stem having a spray cap on its outer end and extending through the opening in the gasket and in sealing engagement therewith to a position adjacent the bottom of the cup member, and into a reduced portion thereof and providing a normally open discharge passage from the cup, a fluid supply tube, means supporting the tube below the cup for communication therewith, said hollow stem when depressed operating first to close the discharge passage from the cup through the stem and then to open a passage from the fluid supply tube to the cup to fill the cup, and means including a spring and a part of the tubular cup member normally closing the inlet passage to the cup.

21. A metering valve comprising: a tubular member having one end secured against a sealing gasket having a central opening, a fluid intake conduit supported at the other end of said tubular member, means defining an inlet passage into said tubular member from said conduit, means defining a normally open discharge passage from said tubular member including a hollow stem passing through the opening in said sealing gasket into said tubular member and having a spray cap secured to the outer end thereof, and spring urged means normally closing said inlet passage, said hollow stem being depressible to engage said spring urged means to close said discharge passage and then to shift said spring urged means sufficiently to open said inlet passage and permit the tubular member to fill with fluid, movement of said stem in the opposite direction permitting the volume of fluid in the tubular member to discharge through the spray cap.

22. A metering valve comprising: a tubular member forming a measuring chamber and having its upper end secured against a sealing gasket having a central opening, a fluid intake conduit supported on a depending reduced portion of said tubular member, a valve member movable in said reduced portion and normally urged upwardly against an internal valve surface formed on said reduced portion to prevent fluid from flowing into said measuring chamber, a hollow stem extending through the opening in said sealing gasket into said measuring chamber with its inner end guided in a tubular portion upstanding from said valve surface, said upstanding tubular portion having internal vertically extending ribs to provide a normally open discharge passage from the measuring chamber member through the hollow stem, and a spray cap secured to the upper end of said hollow stem and having an atomizing aperture formed therein, the inner end of said hollow stem having a valve surface engageable with said valve member to close said discharge passage, said stem being depressible to close said discharge passage and then to shift said valve member to permit the measuring chamber to fill up with fluid, release of said stem permitting the volume of fluid in the measuring chamber to escape through the spray cap.

23. A metering valve comprising: a tubular measuring chamber having one end secured against a sealing gasket having a central opening and the other end connected to a fluid intake conduit, a hollow stem extending through the opening in said gasket into said measuring chamber, said hollow stem providing a normally open discharge passage from said measuring chamber, a spring urged valve member normally closing an inlet passage to said measuring chamber from said conduit, said stem being shiftable inwardly of said measuring chamber to engage said valve member and close said discharge passage and then to shift said valve member against the spring to open said inlet passage and permit said measuring chamber to fill with fluid.

References Cited in the file of this patent

UNITED STATES PATENTS 2,781,954     Bretz  ---------------- Feb. 19, 1957